May 27, 1924.
R. VON BROCKDORFF
DEVICE FOR THE ELECTRIC HEATING OF LIQUIDS
Filed Dec. 3, 1920
1,495,465
4 Sheets-Sheet 1
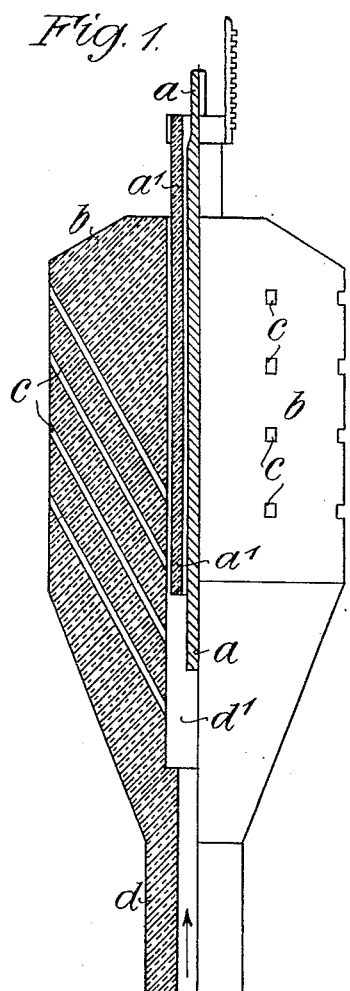
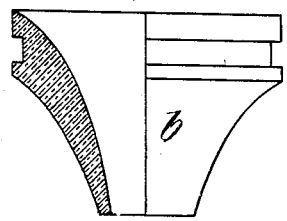
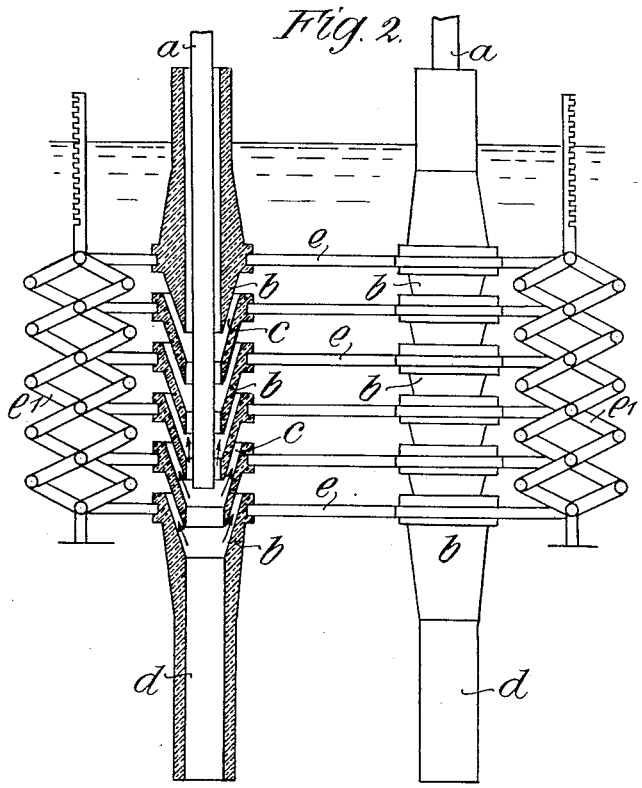
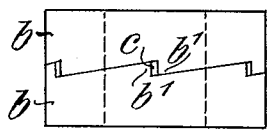
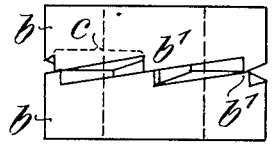
Inventor
Rudolf von Brockdorff
by Watson, Coit,
Morse & Grindle,
Attorneys.

May 27, 1924. 1,495,465
R. VON BROCKDORFF
DEVICE FOR THE ELECTRIC HEATING OF LIQUIDS
Filed Dec. 3, 1920 4 Sheets-Sheet 2
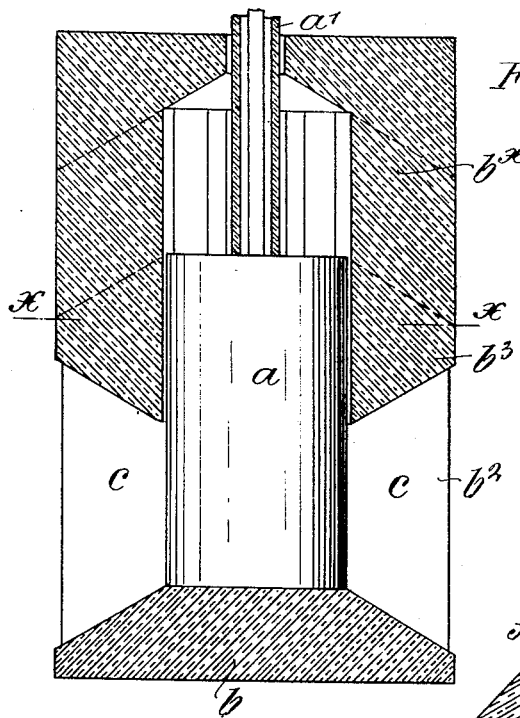
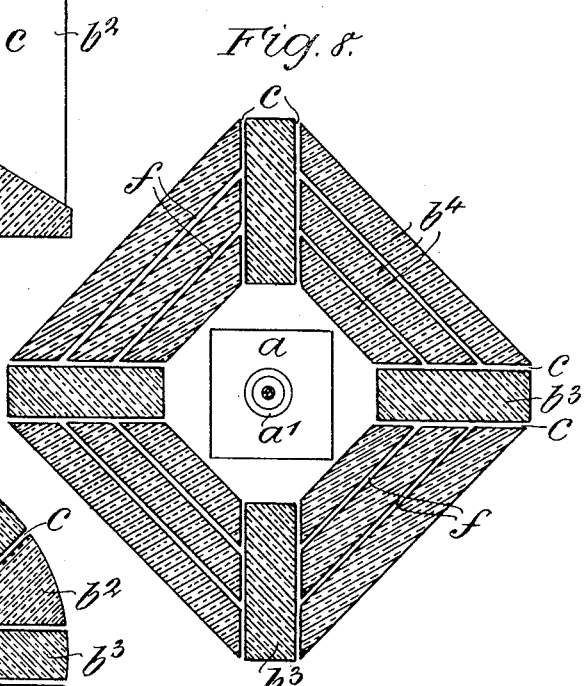
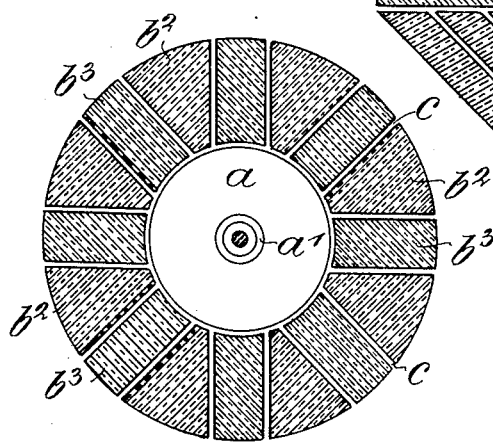
Witnesses:
Emil Kayser
[signature]
Inventor
Rudolf von Brockdorff
by: Watson Cox
Morse & Grindle
Attorneys.

May 27, 1924.  
R. VON BROCKDORFF  
1,495,465  
DEVICE FOR THE ELECTRIC HEATING OF LIQUIDS  
Filed Dec. 3, 1920  4 Sheets-Sheet 3
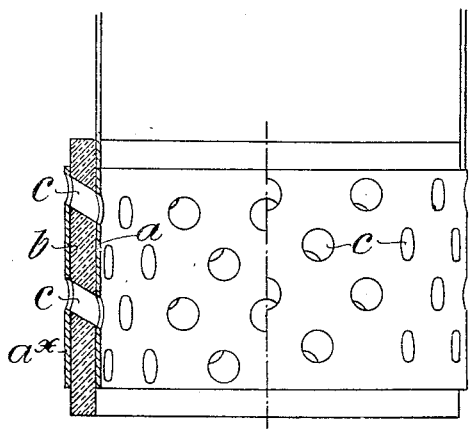
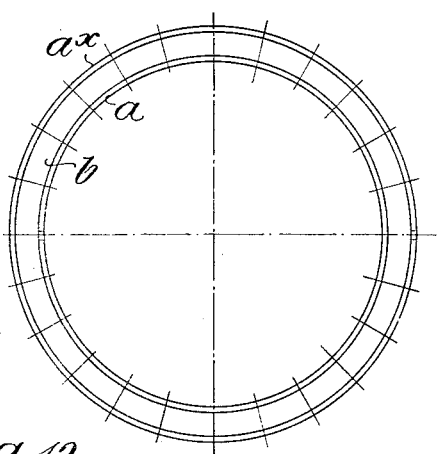
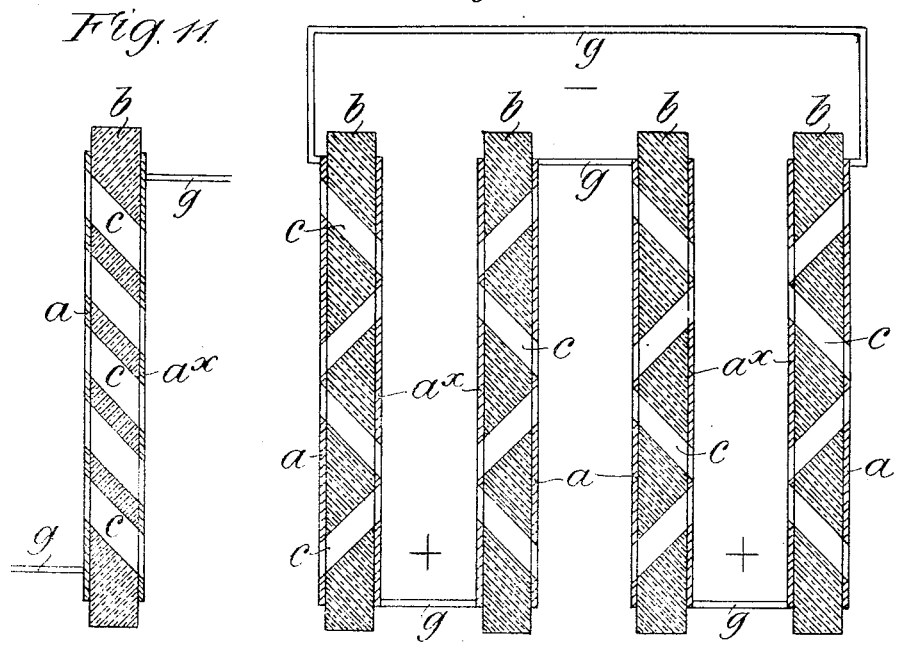
Witnesses:
Emil Kayser
Inventor
Rudolf von Brockdorff
by Watson, Coit,
Morse & Grindle,
Attorneys.

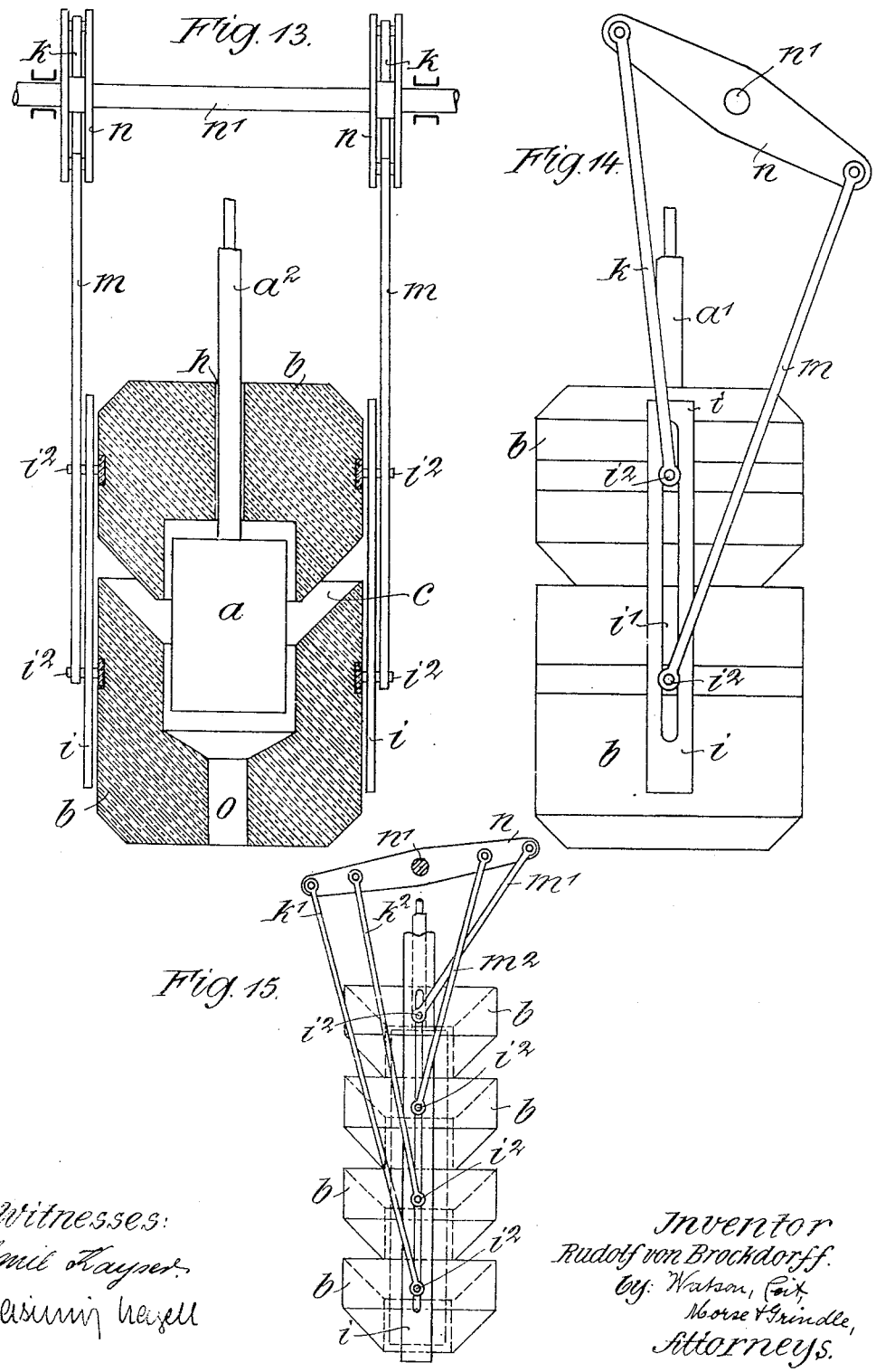

Patented May 27, 1924.

1,495,465

UNITED STATES PATENT OFFICE.

RUDOLF VON BROCKDORFF, OF MUNICH, GERMANY.

DEVICE FOR THE ELECTRIC HEATING OF LIQUIDS.

Application filed December 3, 1920. Serial No. 428,162.

*To all whom it may concern:*

Be it known that I, Freiherr RUDOLF VON BROCKDORFF, a citizen of the German Republic, residing at Munich, Germany, have invented certain new and useful Improvements in Devices for the Electric Heating of Liquids, of which the following is a specification.

This invention relates to a device for heating liquids wherein the liquid itself forms the resistance. Such devices are specially used in connection with electric boilers, but they can be used also in other cases for heating liquids.

According to the invention the electrode, which feeds the current to the liquid is connected with one or several insulating bodies which either form passages or in which passages are arranged. The insulating bodies with the passages can be arranged with regard to the electrode preferably in such a manner that the electrode is encased in the same or that they surround the electrode like a sleeve. The electrode (or the electrodes) could further be in the shape of a plate (straight or curved) in which case the insulating body (or the insulating bodies) would also be plate-shaped.

The passages are then filled with liquid (hereinafter only water will be considered as the liquid), and the electrical energy is supplied to the water in said passages, the fall of potential taking place also in these passages. The passages serve not only to determine the direction of flow for the water but they influence in a similar manner the direction of flow within the water.

The principal heating and evaporating takes place in the passages whereby it is avoided that these phenomena take place at the current-carrying metal electrode. In this manner the production of fire phenomena, which are accompanied by the formation of steam bubbles at the metal electrode and the deposit of incrustations upon the electrode are also prevented. Incrustations are formed as scum in the passages from where they are immediately removed by the velocity of the flow of water in said passages.

With the electric heating devices for liquids of known types vertical insulating tubes are generally used which surround the electrodes at a certain distance. On these insulating bodies layers of different temperatures were formed, the production of steam and the heating of the liquid taking place principally in closest proximity of the electrode. The efficiency of the device is unfavorably influenced and the regulatability impeded owing to the formation of the steam bubbles and by the deposit of incrustations upon the electrode. The incrustations which have an insulating effect were pierced by the electric high voltage whereby destructions of the insulating porcelain parts occurred. With the arrangements of known type voltages of over 12000 volts could not be used, the improved device being adapted for low voltage as well as for high voltages of 25000 volts and more.

In the accompanying drawings several forms of construction of the invention are shown.

Figure 1 shows partially in section and partially in elevation one form of insulating body surrounding an electrode.

Figure 2 shows a pair of electrodes surrounded by a plurality of insulating bodies whose distances apart are regulated by a lazy-tong system.

Figure 3 is a detail view partly in section of a modification of the individual insulating bodies shown in Figure 2.

Figures 4 and 5 show in elevation a pair of insulating bodies of a different type.

Figures 6 and 7 show in longitudinal and cross section respectively another modification of the invention.

Figure 8 shows in cross section still another modification.

Figure 9 shows partly in elevation and partly in section a modification in which the insulating body is between metallic plates.

Figure 10 is a plan view of the modification of Figure 9.

Figures 11 and 12 are vertical sections of a modification similar to that of Figure 9.

Figures 13, 14 and 15 are modifications of the general type of Figure 2 with a different displacing arrangement.

Fig. 1 represents, partly in vertical section, partly in elevation a form of construction in which a metal electrode $a$ is enclosed in an insulating body $b$. The electrode $a$ is surrounded, in well known manner, at its upper part, by an insulating tube $a'$ which leaves free only the lower effective part of the electrode $a$. By adjusting the relative position of $a$ and $a'$ the effective free surface of the electrode $a$ can be varied in well known manner.

Channels or passages $c$ are provided in the insulating body $b$ which are outwardly inclined in upward direction. The size of the inner space in which the electrode $a$ is located is regulated according to the electrode. The metal electrode can be chosen of such a size that the current goes over into the water without fall of potential worth mentioning. The effective resistance acts in the channels or passages $c$ which are of comparatively small cross section.

The water enters into the inner space $d'$ of the insulating body from below through a long pipe $d$ made from insulating material as shown in the drawing, made in one piece with the insulating body $b$. Inside the pipe $d$ there is produced such a high resistance of the column of liquid that only a small current can flow in the same.

It is not necessary that the channels or passages $c$ be rectilinear; they could also be curved in such a shape that not only a greater length of passage within the insulating body $b$ of given diameter is obtained but that further a gyrating movement within the boiler is communicated to the flowing water when the same leaves the insulating body, whereby the heated water is uniformly distributed. The part $a'$ does not only cover the electrode $a$ partly but it is utilized further to cover some of the channels or passages $c$ (the two upper channels in Fig. 1), so that through these passages no considerable flow of water takes place.

In the form of construction shown in Fig. 2 the insulating bodies $b$ have the shape of truncated hollow cones between which channels or passages $c$ of circular cross section are provided. The lowest hollow cone $b$ carries the supply pipe $d$ through which the liquid is supplied from below. In the figure several electrodes $a$ are indicated in parallel connection. The several insulating bodies $b$ situated at the same height are supported by rods $e$ mounted on systems of articulated levers $e'$ so that they can lift or lower the hollow cones through the movement of the systems of articulated levers $e'$ in the well known manner, the distance between the different hollow cones and consequently the cross sections of the channels $c$ being thus varied according to requirement. The several insulating bodies can evidently be also of another shape, such as for example shown in Fig. 3. Any desired resistance capacity can be obtained by varying the number of the several insulating bodies (Figs. 2 and 3), the shape of the same and consequently the shape of the channels or passages by varying the inclination or curvature of the bodies by varying the dimensions and by varying the axial distance of the different parts with regard to each other.

Figs. 4 and 5 show a form of construction in two different positions in which two insulating bodies $b$ have teeth $b'$ upon the adjacent surfaces. By rotating the insulating bodies $b$ the one with regard to the other, the width of the channels or passages $c$ formed by the teeth can be varied in wide limits as can be clearly seen from Figs. 4 and 5.

Instead of using a supply pipe $d$ for conducting the water to the inner space $d'$ of the insulating bodies separate supply channels could be provided which, with an insulating body as shown in Fig. 1, would preferably be arranged so that they are upwardly inclined from the outside towards the center.

For regulating the load an axial movability and a rotatability of the insulating bodies can be used. The regulation could further be effected by varying the water level with regard to the insulating bodies. This is obtained in a simple manner by adjusting the insulating body or the insulating bodies in vertical direction or by varying the water level.

The insulating bodies are best made of porcelain or of similar material. The manufacturing of the insulating bodies is much simpler than the manufacturing of the long and wide porcelain tubes used at present, specially when they are composed of separate parts as shown for example in Figs. 2 and 3. With insulating bodies composed of several parts any desired resistance can be obtained by varying the number and the mutual position of said parts, the several parts having to execute only inconsiderable regulating movements. With the vertical porcelain tubes of known construction, movements from up to one meter and more are necessary for regulating purposes, said movements necessitating a considerable height of the boiler. With the new arrangement according to this invention small and comparatively light boilers can be used.

Fig. 6 shows in a vertical section and Fig. 7 shows in a horizontal section on line X—X of Fig. 6 a form of construction in which the channels or passages for the water are limited by parallel side walls.

According to Fig. 6 a cylindrical electrode is surrounded by a comparatively tightly fitting insulating body $b$ so that said insulating body covers completely the lower part of the electrode, its cylindrical part being traversed by channels or passages $c$ of rectangular cross section. The channels or passages $c$ are limited by the parts $b^2$ of the insulating body $b$ which are segment-shaped in cross section.

The insulating body $b^x$ is mounted from above upon the electrode $a$ covering the same like a cap and having downwardly directed extensions $b^3$ projecting between the extensions $b^2$ of the lower insulating body. In this manner passages or channels $c$ are formed which traverse the insulating body radially from the electrode $a$ towards the outside, the lateral walls of said channels or passages being parallel as shown in the drawing. It would however be sufficient if said side walls are approximately parallel with one another. The liquid fills the channels $c$ and the flow starting from the electrode $a$ passes radially through the channels $c$. The flow is propagated in the liquid in the channel $c$ that is to say in transverse direction. The liquid contained in the channel $c$ is heated so that it flows in upward direction getting out of the channels in a continuous flow at the upper ends, fresh liquid flowing continuously in from below. A regulation within wide limits is obtained if the electrode $a$ separated above and below from the liquid by the bodies $b$ and $b^x$ is brought more or less in contact with the water through the insulating body $b^x$ being adjusted in vertical direction, the height of the channel $c$ being varied accordingly.

The arrangement can be further modified by providing upon the upper insulating body $b^x$ the parts $b^2$ which are of segment-shaped cross section but which can also be of a different cross section, said parts being otherwise constructed so that the channels $c$, formed between the same, are free at the upper ends, the electrode $a$ being then covered merely by a disk-shaped insulating body corresponding with the cross section of said electrode. The parts $b^3$ which, according to Fig. 7, penetrate between the parts $b^2$, that is to say penetrate from above into the channels $c$ must in this case be arranged in the lower insulating body so that they project from below to above between the segment-shaped parts $b^2$. In this case the channels $c$ are unlimited towards the upper end so that the liquid can flow upward without any impediment, steam bubbles finding thus a better escape in upward direction.

Fig. 8 shows in cross section, a form of construction in which a square electrode $a$ is arranged in an insulating body formed by plates $b^4$, said plates being distributed in such a manner that channels $c$ are formed which are adapted to be adjusted in height by means of separate parts $b^3$ in the manner described with reference to Fig. 6 so that the length of the channels $c$ is varied.

The composition of the insulating body of separate plates which are traversed through their entire height by channels $f$ is preferable for certain insulating materials. The channels $f$ connect points of the adjacent channels which possess the same potential so that a uniform distribution of the field which is of particular advantage with regard to electric strength, is obtained in the insulating body. There does not take place in the channels $f$ any loss of energy worth mentioning.

In Figs. 9 to 12 forms of construction of the object of the invention are shown in which the electrodes are directly connected with the insulating body comprising the channels or passages. This construction, which is essentially adapted for moderate capacities, is arranged so that the electrode is formed by the metallic coating of the insulating body.

In the form of construction shown in one half of Fig. 9 in a vertical section and in the other half of the same figure in elevation and in Fig. 10 in a plan view the tubular insulating body $b$ has upon its inner surface a metal coating $a$ which forms the current-carrying electrode and it is covered upon the outer surface also with a metal coating $a^x$. A number of channels or passages $c$ which are inclined in upward direction from the center outwards traverse the tubular body.

If such a device is suspended in a receptacle filled with liquid, steam bubbles are produced in the channels or passages $c$ when the current flows through the same so that the current which has to flow over from the metal coating $a$ to the metal coating $a^x$, can be interrupted by said steam bubbles. This is specially the case when the channels or passages $c$ are of narrow diameter. When there are, however provided a rather large number of channels or passages $c$, a certain number of the same are not filled with steam wherefrom it follows that, although variations of load can be caused by the steam bubbles in some of the channels $c$ the load of the device will always remain constant so far that variations cannot be perceived, for example in measuring instruments. By choosing the lengths for the channels $c$ it is possible to adapt the device to the different voltages. This form of construction is applicable for very large capacities as well—for example with so-called immersible heaters—as for greater resistances of liquid and for capacities up to several hundred K W. The length of the channels $c$ can be varied further, as has already been explained above, maintaining the same thickness of the insulating body $b$, by modifying the inclination of the holes as opposed to the radial arrangement shown in the drawing.

In Figs. 11 and 12 such a form of construction with plate-shaped plane insulating bodies $b$ is shown, Fig. 11 showing a single plate and Fig. 12 showing several plates combined to form one apparatus. In both figures the insulating bodies $b$ have inclined channels $c$ which are either all of the same direction as shown in Fig. 11 or, as shown in Fig. 12, alternately run in opposite directions. The plates have metal coatings $a$ and $a^x$ upon both surfaces, the metal coatings of the different plates of Fig. 12 being connected the one with the other by separate metal parts $g$. The outer conducting wires can be connected to said parts $g$ in any convenient manner.

Owing to the inclined position of the different channels in the several plates according to Fig. 12 a strong flow of liquid is obtained upon either side of each plate whereby the deposit of air and steam bubbles is prevented. The cross section and the direction of the different channels can be varied in various ways. It is not necessary that the plates stand in vertical position as shown in the figures; they could be horizontal in which case the channels would be vertical. The openings in the metal coatings $a$ and $a^x$ need not coincide exactly with the cross section of the channels, there could be for example, metal bridges placed over the mouth of very large channels.

In Figures 13 and 15 a form of construction is shown which is principally adapted for plants of great capacity in which the insulating bodies are particularly large and heavy so that it would be difficult to adjust the same by means of lever systems $e$, $e'$ as shown by Fig. 2. In this case the adjacent insulating bodies could be mutually adjusted in being connected with an adjusting device in such a manner that the weights of the bodies are balanced.

In the form of construction which is shown in Fig. 13 in section and in Fig. 14 in elevation at 90° to the plane of Fig. 13, only two heavy insulating bodies $b$ are arranged one above the other, which enclose between them a channel $c$ of circular cross section, said insulating bodies enclosing the electrode $a$ so that at the lower end a supply channel $o$ for the liquid is formed, while the bore $h$ in the upper insulating body, through which projects the extension $a^2$ of the electrode, is as narrow as possible.

At the side of the two insulating bodies $b$, rails $i$ are arranged in the liquid receptacle in a convenient manner in vertical position. These rails $i$ have longitudinal slots $i''$ through which project supporting studs $i^2$ of the insulating bodies $b$. These supporting studs $i^2$ are connected by rods $k$ and $m$ with the lever $n$. The rods as well as the lever are evidently arranged at either side as shown in Fig. 13 and levers resting upon a common axle $n'$.

The balancing of the weights of the two insulating bodies $b$ is thus obtained.

The lateral mounting of the axle $n'$ for the levers $n$ as shown in Fig. 14 is arranged for the reason that the current supply to the electrode $a$ is thus not interfered with.

Fig. 15 shows a plant with four insulating bodies $b$ which are supported by studs $i^2$ in straight guides $i$, said studs $i^2$ being connected by means of rods $k'$, $k^2$ and $m'$, $m^2$ with the two arms of the lever $n$. When the points of suspension of the rods $k$ and $m$, as indicated in Fig. 15, are placed at corresponding distances apart on the lever $n$, there is obtained, owing to the ratio of the levers, a reciprocal displacement of the insulating bodies $b$ always in the same proportions when the lever $n$ is oscillated.

If in any form of construction an odd number of insulating bodies is used, the middle insulating body is preferably fixed, those above and below the same being made movable with regard to each other and with regard to the fixed middle body. This fixed middle body will preferably be used for mounting the current carrying electrode and the conducting wires.

I claim:—

1. A device for the electric heating of liquids in which the liquid itself forms the resistance, comprising in combination with a current carrying electrode, an insulating body provided with passages which surrounds said electrode so that the transformation of the electric energy into heat takes place in said passages, said passages running in an outwardly inclined direction as regards the axis of said electrodes.

2. A device for the electric heating of liquids in which the liquid itself forms the resistance, comprising in combination with a current carrying electrode, several insulating bodies surrounding said electrode, and means for displacing said insulating bodies with regard to each other in axial direction so that passages are formed by the spaces between said insulating bodies, the transformation of the electric energy into heat taking place in said passages.

3. A device for the electric heating of liquids in which the liquid itself forms the resistance, comprising in combination with a current carrying electrode, several insulating bodies surrounding said electrode, projecting teeth on said insulating bodies, and means for displacing said insulating bodies with regard to each other in axial direction so that passages are formed by the spaces between said teeth of the insulating bodies, the transformation of the electric energy into heat taking place in said passages.

4. A device for the electric heating of liquids in which the liquid itself forms the resistance, comprising in combination with a current carrying electrode, several insulating bodies surrounding said electrode having passages for the liquid with parallel side walls radially extending outwards from the electrode so that the electric current flows at right angles through the liquid ascending in said passages, and means for displacing said insulating bodies with regard to each other in axial direction so that the passages are measured by the distances between said insulating bodies, the transformation of the electric energy into heat taking place in said passages.

5. A device for the electric heating of liquids in which the liquid itself forms the resistance, comprising in combination with a current carrying electrode several insulating bodies surrounding said electrode having passages for the liquid with approximately parallel sides walls radially extending outwards from the electrode so that the electric current flows at right angles through the liquid ascending in said passages, and means for displacing said insulating bodies with regard to each other in axial direction so that the passages are measured by the distances between said insulating bodies, the transformation of the electric energy into heat taking place in said passages.

6. A device for the electric heating of liquids in which the liquid itself forms the resistance, comprising in combination with a current carrying electrode, several insulating bodies surrounding said electrode having passages for the liquid, extensions on said insulating bodies extending into said passages, and means for displacing said insulating bodies with regard to each other in axial direction so that the passages are measured by the distances between said teeth of the insulating bodies, the transformation of the electric energy into heat taking place in said passages.

7. A device for the electric heating of liquids in which the liquid itself forms the resistance, comprising in combination with a current carrying electrode, several insulating bodies surrounding said electrode, comprising several plates separated by channels, said insulating bodies being provided with passages, the points of equal potential of said passages being connected by said channels, and means for displacing said insulating bodies with regard to each other in axial direction so that the passages are measured by the distances between said insulating bodies, the transformation of the electric energy into heat taking place in said passages.

8. A device for the electric heating of liquids in which the liquid itself forms the resistance, comprising in combination with a current carrying electrode several insulating bodies surrounding said electrode comprising several plates, one of said plates being provided with a channel, said insulating bodies being provided with passages for the liquid, points of equal potential of said passages being connected by said channel, and means for displacing said insulating bodies with regard to each other in axial direction so that the passages are measured by the distances between said insulating bodies, the transformation of the electric energy into heat taking place in said passages.

9. A device for the electric heating of liquids in which the liquid itself forms the resistance comprising in combination with a current carrying electrode, several insulating bodies surrounding said electrode comprising several plates, one of said plates being provided with several channels, said insulating bodies being provided with passages for the liquid, points of equal potential of said passages being connected by said channels, and means for displacing said insulating bodies with regard to each other in axial direction so that the passages are measured by the distances between said insulating bodies, the transformation of the electric energy into heat taking place in said passages.

10. A device for the electric heating of liquids in which the liquid itself forms the resistance comprising in combination with a current carrying electrode, several insulating bodies surrounding said electrode comprising several plates, one of said plates being provided with several channels, inclined with regard to the horizontal plane, said insulating bodies being provided with passages for the liquid, points of equal potential of said passages being connected by said channels, and means for displacing said insulating bodies with regard to each other in axial direction so that the passages are measured by the distances between said insulating bodies, the transformation of the electric energy into heat taking place in said passages.

11. A device for the electric heating of liquids in which the liquid itself forms the resistance, comprising in combination with a current carrying electrode, a tubular insulating body provided with passages which surrounds said electrode so that the transformation of the electric energy into heat takes place in said passages, and a metal coating upon said tubular insulating body.

12. A device for the electric heating of liquids in which the liquid itself forms the resistance, comprising in combination with a current carrying electrode, several insulating bodies surrounding said electrode, a lever system connecting said insulating bodies so that their weights are balanced, and means for displacing said insulating bodies with regard to each other in axial direction so that the passages are formed by the spaces between said insulating bodies, the transformation of the electric energy into heat taking place in said passages.

13. A device for the electric heating of liquids in which the liquid itself forms the resistance, comprising in combination with a current carrying electrode an odd number of insulating bodies surrounding said electrode, the middle insulating body being fixed and used for mounting the electrode and the conducting wires, and means for displacing the other insulating bodies with regard to each other in axial direction so that passages are formed by the spaces between said insulating bodies, the transformation of the electric energy into heat taking place in said passages.

14. A device for the electric heating of liquids in which the liquid itself forms the resistance, comprising in combination with a current carrying electrode, an insulating body surrounding said electrode and having passages therein, the passages forming guideways for directing the circulation of the liquid, the transformation of the electric energy into heat taking place in the passages.

In testimony whereof I affix my signature in presence of two witnesses:

RUDOLF von BROCKDORFF.

Witnesses:
 JOSEF SCHRIFFISSENY,
 PAUL DREY.